No. 769,188. Patented September 6, 1904.

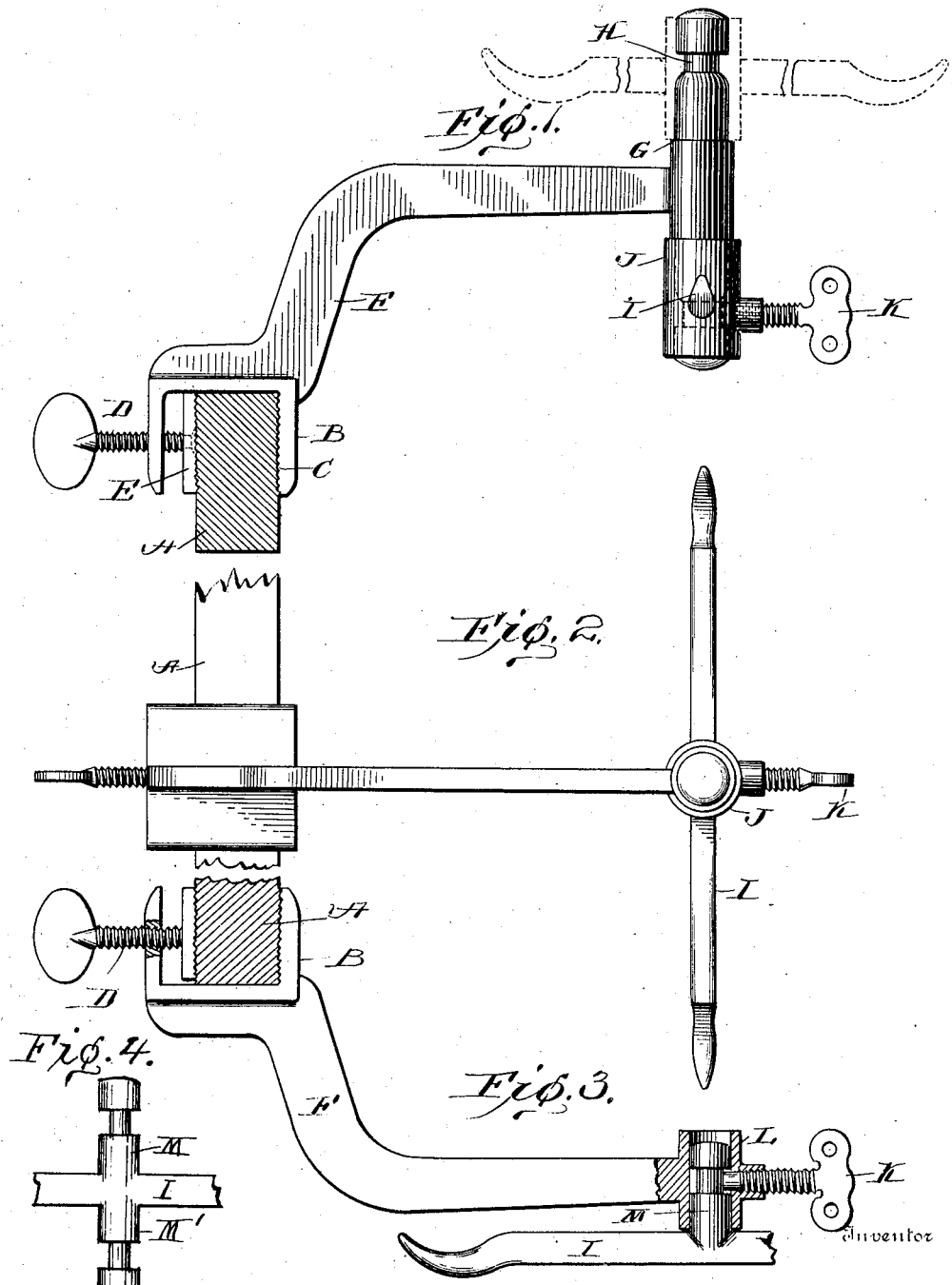

UNITED STATES PATENT OFFICE.

PATRICK J. SHANNON, OF ATHENS, PENNSYLVANIA.

CARCASS-HANGER.

SPECIFICATION forming part of Letters Patent No. 769,188, dated September 6, 1904.

Application filed February 25, 1904. Serial No. 195,214. (No model.)

*To all whom it may concern:*

Be it known that I, PATRICK J. SHANNON, a citizen of the United States, residing at Athens, in the county of Bradford and State of Pennsylvania, have invented new and useful Improvements in Carcass-Hangers, of which the following is a specification.

The object of the invention is to provide a convenient readily-adjustable device for suspending dressed animals in market-stalls and the like, and especially to provide for varying the height of the suspending device and for turning the same horizontally and locking it in any desired adjustment.

In the accompanying drawings, Figure 1 is a side elevation of the apparatus. Fig. 2 is a plan view of the same. Fig. 3 illustrates a slight modification. Fig. 4 illustrates a slight modification of the construction shown in Fig. 3.

In the figures, A represents the bar of an ordinary rack, which is usually at a short distance from and parallel to one wall of the room or stall, and B is a U-shaped clamp-body, preferably having one roughened or corrugated face C and adapted to drop downward over the bar A. In the rear wall of this body works a set-screw D, upon the inner end of which is revolubly mounted a preferably roughened clamping-plate E to coact with the face C in gripping the bar A. From the body of the clamp a rigid arm F extends upward and then forward, terminating in a vertical bar G, extending above and below the arm. Each end portion of this bar is made cylindrical and provided with a circumferential groove H. Upon either portion, as may be desired, is slipped a gambrel I, having a central sleeve J, in the wall of which which works a set-screw K, adapted to enter the groove and both prevent the withdrawal of the sleeve and lock it against rotation when it is in any desired position.

The gambrel is placed upon the upper or lower end of the rod, according as the user finds one or the other position more convenient, owing to his own height or to the size of the suspended animal. As the force exerted on the rack-bar is torsional, the device may be inverted, as shown in Fig. 3, giving a wider range of adjustment of the preferred form and a slightly less range with the other form.

Usually sheep and calves are suspended in the markets without removing the skin. Later when the skin is to be removed much difficulty is experienced because the workman must reverse the animal on the hook or must crowd into the narrow space next the wall. The former, when the carcass weighs perhaps more than the workman, is difficult and the latter is often practically out of the question. This apparatus avoids both evils. Suspending the carcass is also greatly facilitated, for the clamp being rigidly fixed to the bar and the gambrel being rigidly locked in position attaching the carcass is comparatively easy, there being no necessity for holding hooks with one hand while seeking to attach the carcass. It is also a simple matter to detach the gambrel, secure the carcass thereto, and then lift it to position and secure it by the set-screw. It is also clear that the gambrel may be turned, in skinning the animal, for example, as often as may be desired and be instantly fixed in any of its positions.

Fig. 3 shows the modification of substituting a sleeve L for the bar G and a bar M for the sleeve J of the gambrel. In this case the gambrel has its bar M projecting upward only, and the possible adjustments are lessened.

Fig. 4 shows a part of a gambrel having the bar M of Fig. 3 and also a downwardly-projecting bar M'. In this form the adjustments are substantially the same as in the devices of Figs. 1 and 2.

Other modifications may be made without passing the proper limits of my invention, and I do not therefore wish to limit myself to the construction shown.

What I claim is—

1. The combination with a reversible clamp having a rigid arm extending to a point at some distance from the horizontal plane of the clamp, of a gambrel to be supported by the free end of said arm, and means for rotatably securing the gambrel, while keeping it the same side up, to said free end and at will above or below the same.

2. The combination with a clamp having a rigid arm member extending to a point at some distance from the horizontal plane of the clamp, of a gambrel member to be supported by the free end of said arm, one of said members being provided with both an upwardly-extending pivotal bar and a downwardly-extending pivotal bar, and the other with a socket adapted to receive either of said bars, substantially as set forth.

3. The combination with a reversible clamp having a rigid arm extending to a point at some distance from the horizontal plane of the clamp, of a gambrel rotatably suspended from the free end of said arm and freely revoluble while suspended, and means for at will locking the gambrel at any point in its rotary path.

4. The combination with a reversible clamp having a rigid arm projecting to a point at some distance from both the vertical and horizontal planes of the clamp and provided at its free end with similar upwardly and downwardly projecting studs, a gambrel adapted to be mounted upon either stud, and means for preventing the removal of the gambrel and for at will locking it rigidly in any desired angular adjustment.

In testimony whereof I have signed my name to this specification in the presence of two subscribing witnesses.

PATRICK J. SHANNON.

Witnesses:
HURLEY D. HENSON,
HARRY L. WOLCOTT.